(12) United States Patent
Rahman

(10) Patent No.: US 11,924,006 B2
(45) Date of Patent: Mar. 5, 2024

(54) ENHANCED METHOD TO DO CHANNEL ESTIMATION IN A MULTIPLE INPUT MULTIPLE OUTPUT BASED CELLULAR RADIO TECHNOLOGY BY LEVERAGING RADIO POWER RECEPTION LEVEL AT PER ANTENNA ELEMENT

(71) Applicant: T-MOBILE INNOVATIONS LLC, Overland Park, KS (US)

(72) Inventor: Muhammad Tawhidur Rahman, Sammamish, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 140 days.

(21) Appl. No.: 17/528,755

(22) Filed: Nov. 17, 2021

(65) Prior Publication Data
US 2023/0155863 A1 May 18, 2023

(51) Int. Cl.
*H04L 25/02* (2006.01)
*H04B 7/0417* (2017.01)
*H04B 17/318* (2015.01)
*H04W 52/24* (2009.01)

(52) U.S. Cl.
CPC ....... *H04L 25/0204* (2013.01); *H04B 7/0417* (2013.01); *H04B 17/318* (2015.01); *H04W 52/245* (2013.01)

(58) Field of Classification Search
CPC . H04L 25/0204; H04B 7/0417; H04B 17/318; H04W 52/245
See application file for complete search history.

(56) References Cited

U.S. PATENT DOCUMENTS

| | | | | |
|---|---|---|---|---|
| 6,788,661 | B1* | 9/2004 | Ylitalo | H04W 52/42 370/320 |
| 10,700,753 | B2* | 6/2020 | Islam | H04B 7/0695 |
| 11,374,725 | B2* | 6/2022 | Duan | H04B 7/063 |
| 2008/0181146 | A1* | 7/2008 | Doan | H01Q 1/2291 370/310 |
| 2012/0314665 | A1* | 12/2012 | Ishida | H01Q 21/28 370/329 |
| 2013/0309981 | A1* | 11/2013 | Ngai | H04B 7/0608 455/78 |

(Continued)

FOREIGN PATENT DOCUMENTS

CN 103634889 A * 3/2014

*Primary Examiner* — Ivan O Latorre
(74) *Attorney, Agent, or Firm* — Shook, Hardy & Bacon L.L.P.

(57) ABSTRACT

Systems and methods are provided for performing channel estimation in a multiple input multiple output (MIMO) based cellular radio technology (e.g., 4G, 5G). Initially, the reference transmission receive power (RSRP) is reported for each antenna element, rather than as a single RSRP. This enables the base station to understand the channel condition for each MIMO transmission/reception. Using that understanding, the base station can determine the radio-frequency (RF) power level per antenna port to provide more enhanced transmission towards a specific UE, resulting in a better service experience. In other words, more accurate channel estimation based on actual RF conditions of a particular UE can be derived so the base station can tune to the actual need of the UE.

13 Claims, 5 Drawing Sheets

(56) References Cited

U.S. PATENT DOCUMENTS

| | | | | |
|---|---|---|---|---|
| 2014/0301342 A1* | 10/2014 | She | ............... | H04W 52/40 |
| | | | | 370/329 |
| 2016/0072598 A1* | 3/2016 | Jonsson | ............... | H04B 17/27 |
| | | | | 455/67.11 |
| 2016/0359538 A1* | 12/2016 | Onggosanusi | ............... | H04L 5/0057 |
| 2018/0097591 A1* | 4/2018 | Islam | ............... | H04W 72/30 |
| 2018/0139036 A1* | 5/2018 | Islam | ............... | H04W 56/001 |
| 2018/0279231 A1* | 9/2018 | Meng | ............... | H04W 52/146 |
| 2018/0332541 A1* | 11/2018 | Liu | ............... | H04W 52/10 |
| 2019/0053171 A1* | 2/2019 | Jung | ............... | H04W 52/16 |
| 2019/0229870 A1* | 7/2019 | Wu | ............... | H04L 27/2613 |
| 2020/0186303 A1* | 6/2020 | Hao | ............... | H04B 7/0626 |
| 2020/0358511 A1* | 11/2020 | Hyung | ............... | H04W 52/242 |
| 2021/0367724 A1* | 11/2021 | Zhang | ............... | H04B 7/0413 |
| 2022/0052743 A1* | 2/2022 | Cha | ............... | H01Q 3/2605 |
| 2022/0078629 A1* | 3/2022 | Ge | ............... | H04W 16/18 |
| 2022/0095145 A1* | 3/2022 | Sakhnini | ............... | H04L 5/0048 |
| 2022/0295409 A1* | 9/2022 | Uno | ............... | H04L 27/26 |
| 2022/0360388 A1* | 11/2022 | Rungta | ............... | H04B 7/0417 |
| 2023/0014784 A1* | 1/2023 | Yao | ............... | H04L 25/0226 |
| 2023/0109687 A1* | 4/2023 | Frank | ............... | H04B 7/0465 |
| | | | | 375/267 |
| 2023/0111064 A1* | 4/2023 | Rahman | ............... | H04W 8/24 |
| | | | | 370/252 |

* cited by examiner

ENHANCED METHOD TO DO CHANNEL ESTIMATION IN A MULTIPLE INPUT MULTIPLE OUTPUT BASED CELLULAR RADIO TECHNOLOGY BY LEVERAGING RADIO POWER RECEPTION LEVEL AT PER ANTENNA ELEMENT

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

In aspects set forth herein, systems and methods are provided for performing channel estimation in a multiple input multiple output (MIMO) based cellular radio technology (e.g., 4G, 5G). More particularly, in aspects set forth herein, systems and methods enable a port-specific power level channel estimation to be derived that reflects the actual radio frequency conditions of the user equipment. To do so, the reference transmission receive power (RSRP) is reported for each antenna element, rather than as a single RSRP. This allows the base station to understand the channel condition for each MIMO transmission/reception. Using that understanding, the base station can determine the radio-frequency (RF) power level per antenna port to provide more enhanced transmission towards a specific UE, resulting in a better service experience.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
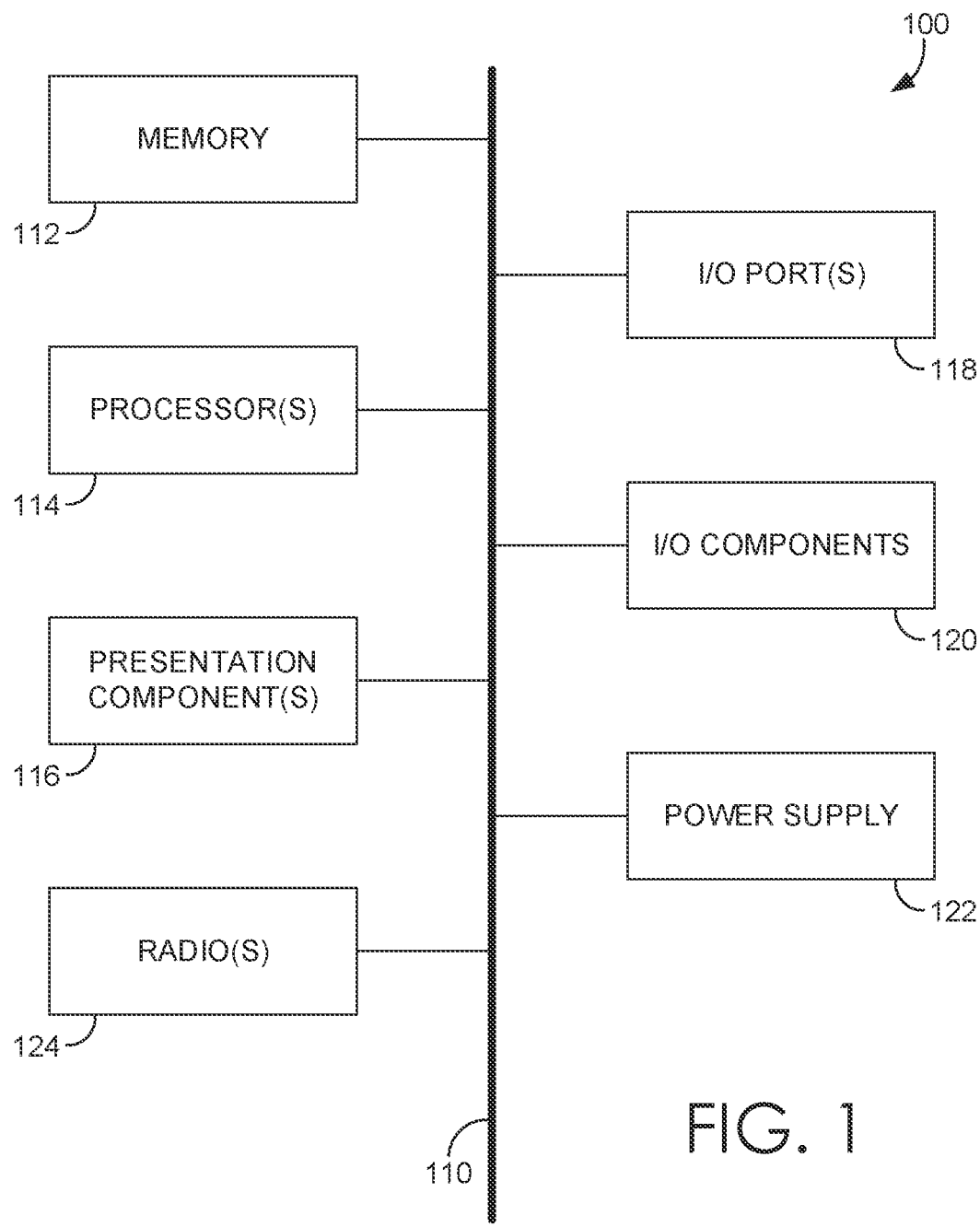
FIG. 1 depicts a diagram of an exemplary computing environment suitable for use in implementations of the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
CD-ROM Compact Disk Read Only Memory
CDMA Code Division Multiple Access
eNodeB Evolved Node B
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MIMO Multiple Input Multiple Output
MD Mobile Device
PC Personal Computer
PCS Personal Communications Service
PDA Personal Digital Assistant
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Transmission Receive Power
RSRQ Reference Transmission Receive Quality
RSSI Received Transmission Strength Indicator
SINR Transmission-to-Interference-Plus-Noise Ratio
SNR Transmission-to-noise ratio
SON Self-Organizing Networks
TDMA Time Division Multiple Access
TXRU Transceiver (or Transceiver Unit)
UE User Equipment Further, various technical terms are used throughout this description. An illustrative resource that fleshes out various aspects of these terms can be found in Newton's Telecom Dictionary, 25th Edition (2009).

As used herein, the term "node" is used to refer to network access technology, such as eNode, gNode, etc. In other aspects, the term "node" may be used to refer to one or more antennas being used to communicate with a user device.

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., cell sites, cell towers) to provide network coverage. The base stations are employed to broadcast and transmit transmissions to user devices of the telecommunications network. An access point may be considered to be a portion of a base station that may comprise an antenna, a radio, and/or a controller. In aspects, an access point is defined by its ability to communicate with a user equipment (UE), such as a wireless communication device (WCD), according to a single protocol (e.g., 3G, 4G, LTE, 5G, and the like); however, in other aspects, a single access point may communicate with a UE according to multiple protocols. As used herein, a base station may comprise one access point or more than one access point. Factors that can affect the telecommunications transmission include, e.g., location and size of the base stations, and frequency of the transmission, antenna array configuration corresponding to both the access point and the UE, among other factors. The base stations are employed to broadcast and transmit transmissions to user devices of the telecommunications network.

Traditionally, the base station establishes uplink (or downlink) transmission with a mobile handset over a single frequency that is exclusive to that particular uplink connection (e.g., an LTE connection with an EnodeB). In this regard, typically only one active uplink connection can occur per frequency; however, the actual antenna array configuration can allow multiple input and multiple output connections between the access point and the UE. For example, an access point having a 4×4 antenna array configuration in communication with a UE having a 4×4 antenna array configuration can have up to 16 connections. The base station may include one or more sectors served by individual transmitting/receiving components associated with the base station (e.g., antenna arrays controlled by an EnodeB). These transmitting/receiving components together form a multi-sector broadcast arc for communication with mobile handsets linked to the base station.

As employed herein, a UE (also referenced herein as a user device) or WCD can include any device employed by an end-user to communicate with a wireless telecommunications network. A UE can include a mobile device, a mobile broadband adapter, or any other communications device employed to communicate with the wireless telecommunications network. A UE, as one of ordinary skill in the art may appreciate, generally includes one or more antenna coupled to a radio for exchanging (e.g., transmitting and receiving) transmissions with a nearby base station.

In aspects, a UE provides port-specific received power level of an antenna element of the plurality of antenna elements to the access point. The access point may utilize the port-specific received power level to dynamically tune a port-specific transmitted power level of the corresponding node antenna element. Additionally, or alternatively, the UE receives a port-specific received power level for each antenna element of a plurality of antenna elements of the node. The UE may utilize the port-specific received power level to dynamically tune a port-specific transmitted power level of the corresponding UE antenna element.

Generally speaking, many modern UEs comprise at least two transmitters; in some configurations, a UEs may operate using dual connectivity. That is, the UE may use at least a first of its transmitters to communicate a first uplink signal to a first node at an access point and at least a second of its transmitters to communicate a second uplink signal to a second node at the access point. In other configurations, a UE may operate using single connectivity, wherein it uses one or more of its transmitters to communicate with a single access point, base station, or cell site at one or more nodes. Conventionally, a communication session between a UE and an access point comprises a handshake.

In aspects, the handshake enables the access point to describe available channels for the UE and/or the access point to communicate port-specific received power level information. For example, the access point may direct the UE to communicate via Physical Uplink Control Channel (PUCCH) or Physical Uplink Shared Channel (PUSCH). Similarly, the access point may communicate to the UE to listen on Physical Downlink Control Channel (PDCCH) or Physical Downlink Shared Channel (PDSCH). The handshake may also enable the access point to direct the UE how and when to communicate (or expect to receive) the port-specific received power level information.

The present disclosure is directed to systems, methods, and computer readable media for performing channel estimation in a multiple input multiple output (MIMO) based cellular radio technology (e.g., 4G, 5G). More particularly, in aspects set forth herein, systems and methods enable a port-specific power level channel estimation to be derived that reflects the actual radio frequency conditions of the user equipment. To do so, the reference transmission receive power (RSRP) is reported for each antenna element (i.e., the port-specific received power level), rather than as a single RSRP. This allows the base station to understand the channel condition for each MIMO transmission/reception. Using that understanding, the base station can determine the radio-frequency (RF) power level per antenna port to provide more enhanced transmission towards a specific UE, resulting in a better service experience.

In other words, more accurate channel estimation based on actual RF conditions of a particular UE can be derived so the base station can tune to the actual need of the UE. In embodiments, the same systems methods can be applied in an uplink fashion such that more accurate channel estimate based on actual RF conditions of the base station can be derived so the particular UE can tune to the actual need of the base station.

A first aspect of the present disclosure is directed to a method for performing channel estimation in a multiple input multiple output (MIMO) based cellular radio technology. A port-specific received power level is received, at a node configured to wirelessly communicate with one or more UEs, for each antenna element of a plurality of antenna elements of a UE of the one or more UEs. The port-specific received power level of an antenna element of the plurality of antenna elements is compared, at the node, to a port-specific transmitted power level of a corresponding node antenna element. Based on the comparing, the port-specific transmitted power level of the corresponding node antenna element is dynamically tuned, at the node.

A second aspect of the present disclosure is directed to a method for performing channel estimation in a multiple input multiple output (MIMO) based cellular radio technology. A port-specific received power level for each antenna element of a plurality of antenna elements of a node is received at a UE configured to wirelessly communicate with the node. The port-specific received power level of an antenna element of the plurality of antenna elements is compared, at the UE, to a port-specific transmitted power level of a corresponding UE antenna element. Based on the comparing, the port-specific transmitted power level of the corresponding UE antenna element is dynamically tuned, at the UE.

Another aspect of the present disclosure is directed to a system for performing channel estimation in a multiple input multiple output (MIMO) based cellular radio technology. The system comprises one or more UEs and a node configured to wirelessly communicate with the one or more UEs. Each of the one or more UEs and the node are configured to: receive, at the node, a port-specific received power level for each antenna element of a plurality of antenna elements; compare the port-specific received power level of an antenna element of the plurality of antenna elements to a port-specific transmitted power level of a corresponding transmitting antenna; and based on the comparing, dynamically tuning the port-specific transmitted power level of the corresponding transmitting antenna.

Turning to FIG. 1, a diagram is depicted of an exemplary computing environment suitable for use in implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 may be a UE, or other user device, capable of two-way wireless communications with an access point. Some non-limiting examples of the computing device 100 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 112, I/O components 110, power supply 122, radio 116, and transmitter 118. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 110. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 110. One or more presentation components 108 presents data indications to a person or other device. Exemplary one or more presentation components 108 include a display device, speaker, printing component, vibrating component, etc. I/O ports 112 allow computing device 100 to be logically coupled to other devices including I/O components 110, some of which may be built into computing device 100. Illustrative I/O components 110 include a microphone, joystick, game pad, satellite dish, scanner, printer, wireless device, etc.

The radio 116 represents one or more radios that facilitate communication with a wireless telecommunications network. While a single radio 116 is shown in FIG. 1, it is contemplated that there may be more than one radio 116 coupled to the bus 102. In aspects, the radio 116 utilizes a transmitter 118 to communicate with the wireless telecommunications network. It is expressly conceived that a computing device with more than one radio 116 could facilitate communication with the wireless telecommunications network via both the first transmitter 118 and an additional transmitters (e.g. a second transmitter). Illustrative wireless telecommunications technologies include CDMA, GPRS, TDMA, GSM, and the like. The radio 116 may additionally or alternatively facilitate other types of wireless communications including Wi-Fi, WiMAX, LTE, 3G, 4G, LTE, 5G, NR, VoLTE, or other VoIP communications. As can be appreciated, in various embodiments, radio 116 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
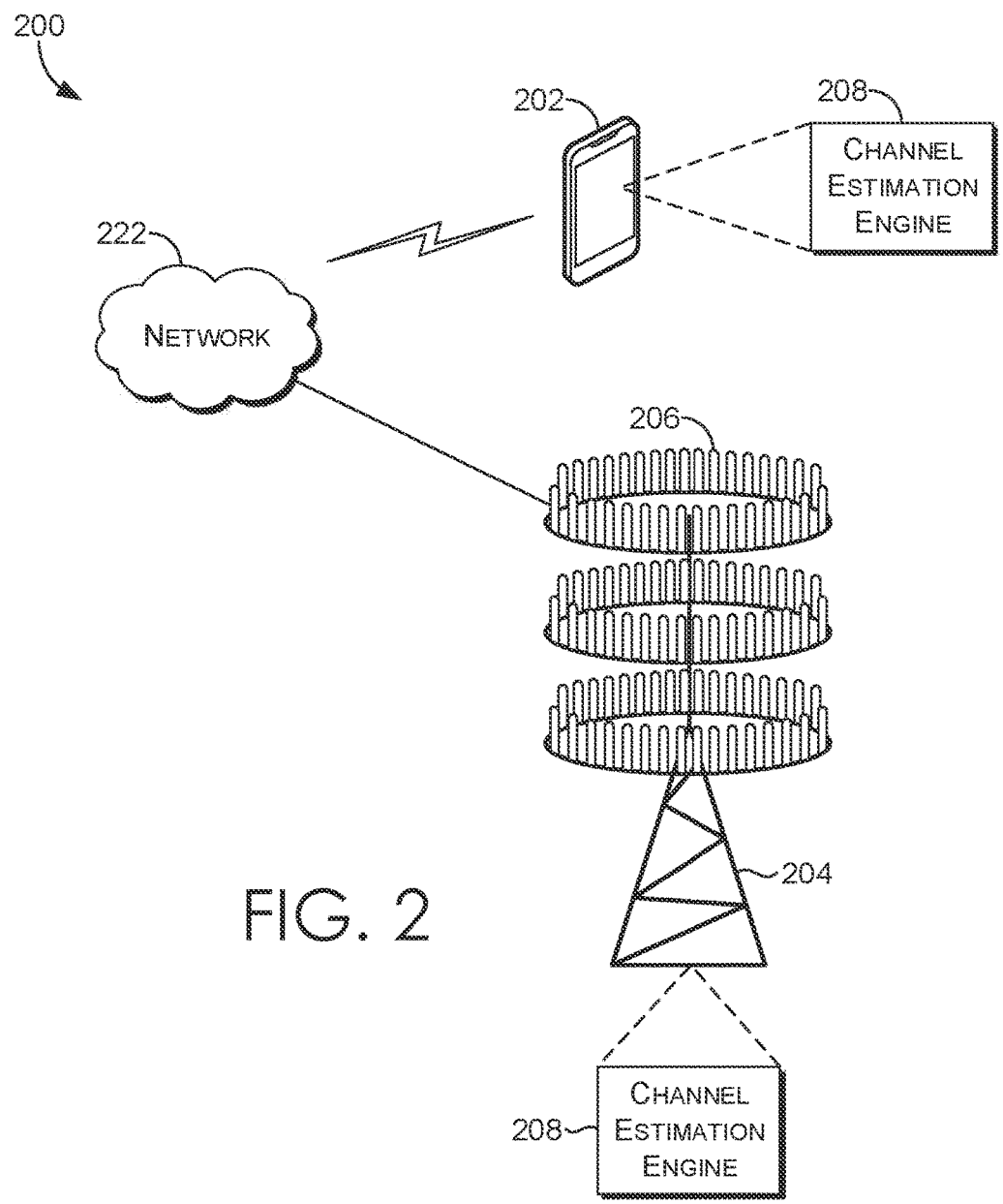
FIG. 2 illustrates a diagram of an exemplary network environment in which implementations of the present disclosure may be employed.

Next, FIG. 2 provides an exemplary network environment in which implementations of the present disclosure may be employed. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Network environment 200 includes UE 202, access point 204 (which may be a cell site, base station, or the like), network 222, and channel estimation engine 208. In network environment 200, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 100) that communicates via wireless communications with the access point 204 in order to interact with a public or private network.

In some aspects, the UE 202 can correspond to computing device 100 in FIG. 1. Thus, a user device can include, for example, a display(s), a power source(s) (e.g., a battery), a data store(s), a speaker(s), memory, a buffer(s), a radio(s) and the like. In some implementations, for example, a UE 202 comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, the UE 202 in network environment 200 can optionally utilize network 222 to communicate with other computing devices (e.g., a mobile device(s), a server (s), a personal computer(s), etc.) through access point 204. The network 222 may be a telecommunications network(s), or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) can provide connectivity in various implementations. Network 222 can include multiple networks, as well as being a network of networks, but is shown in more simple form so as to not obscure other aspects of the present disclosure.

Network 222 can be part of a telecommunication network that connects subscribers to their immediate service provider. In some instances, network 222 can be associated with a telecommunications provider that provides services (e.g., LTE) to user devices, such as UE 202. For example, network 222 may provide voice, SMS, and/or data services to user devices or corresponding users that are registered or subscribed to utilize the services provided by a telecommunications provider. Network 222 can comprise any communication network providing voice, SMS, and/or data service (s), such as, for example, a 1× circuit voice, a 3G network (e.g., CDMA, CDMA2000, WCDMA, GSM, UMTS), a 4G network (WiMAX, LTE, HSDPA), or a 5G network.

In some implementations, access point 204 is configured to communicate with a UE, such as UE 202, that is located within the geographical area, or cell, covered by radio antennas of access point 204. Cell site or access point 204 may include one or more base stations, base transmitter stations, radios, antennas, antenna arrays, power amplifiers, transmitters/receivers, digital signal processors, control electronics, GPS equipment, and the like.

Access point 204 comprises at least one antenna array 216, each antenna array having one or more antenna elements. In aspects, the one or more antennas elements may be a dipole monopole, loop, parabolic, traveling-wave, aperture, yagi-uda, conical spiral, helical, conical, radomes, horn, or any combination thereof having a wavelength of ¼, ½, 1, or 1½ for example. In aspects, antenna array 216 may operate in networks such as 3G, 4G, 5G, and 802.11n, and utilize techniques such as MIMO, MU-MIMO, FD-MIMO, massive MIMO, or any combination thereof. It is noted that adjusting one or more of phase, amplitude, or power of at least one antenna element of antenna array 216 can be broadly applicable to an antenna array targeting any portion of the RF spectrum (though any lower than VHF may be size prohibitive). In one aspect, the antenna may be configured to communicate in the UHF, SHF spectrum, or a combination thereof for example, in the range of 1.3 GHz-30 GHz. Example antenna array 216 comprises 64 antenna elements arranged in an 8×8 structure. In other embodiments, antenna array 216 may comprise antenna elements arranged in an 8×4, 4×8, or 4×4 configuration. Each antenna element or set of antenna elements of the antenna array 216 comprises a connection to other components of access point 200 that facilitate control of the phase, amplitude, power, or any combination thereof of RF signals emitted by the antenna(s).

As shown, in various embodiments, UE 202 and/or access point 204 includes channel estimation engine 208, which comprises various components that are utilized, in various implementations, to perform methods for performing channel estimation in a multiple input multiple output (MIMO) based cellular radio technology. More particularly, the channel estimation engine 208 enables a port-specific power level channel estimation to be derived that reflects the actual radio frequency conditions of the user equipment and/or the access point.

Figure 3:
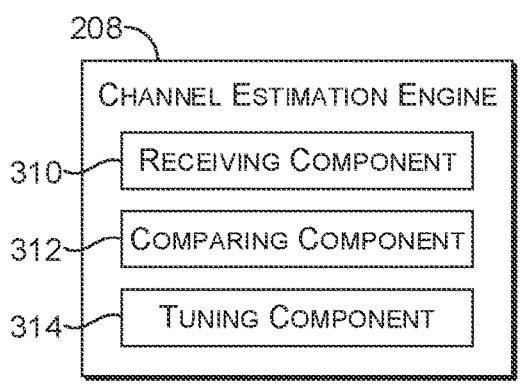
FIG. 3 illustrates a diagram of a channel estimation engine, in accordance with aspects herein.

Referring now to FIG. 3, the channel estimation engine 208 includes several components. In embodiments, the channel estimation engine 208 may include receiving component 310, comparing component 312, and tuning component 314.

Receiving component 310 is generally configured to receive a port-specific received power level for each antenna element of a plurality of antenna elements. Initially, the communication session between a UE and the node may comprise a handshake. As part of the handshake, the node may direct the UE to communicate the port-specific received power level via Physical Uplink Control Channel (PUCCH) or Physical Uplink Shared Channel (PUSCH). Similarly, the access point may direct the UE to listen for the port-specific received power level via Physical Downlink Control Channel (PDCCH) or Physical Downlink Shared Channel (PDSCH). The handshake may also direct the UE how and when to communicate (or expect to receive) the port-specific received power level information.

Comparing component 312 is generally configured to compare the port-specific received power level of an antenna element of the plurality of antenna elements to a port-specific transmitted power level of a corresponding transmitting antenna element. In some aspects, the antenna element of the plurality of antenna elements corresponds to the node and the corresponding transmitting antenna element corresponds to a UE of the one or more UEs. In other aspects, the antenna element of the plurality of antenna elements corresponds to a UE of the one or more UEs and the corresponding transmitting antenna element corresponds to the node.

Tuning component 314 is generally configured to, based on the comparing, dynamically tune the port-specific transmitted power level of the corresponding transmitting antenna element. In some aspects, the port-specific transmitted power level of the corresponding transmitting antenna element is incrementally increased if the comparing indicates a ratio of the port-specific received power level of the antenna element of the plurality of antenna elements is above a threshold. In other aspects, the port-specific transmitted power level of the corresponding transmitting antenna element is incrementally decreased if the comparing indicates a ratio of the port-specific received power level of the antenna element of the plurality of antenna elements is below a threshold.

Figure 4:
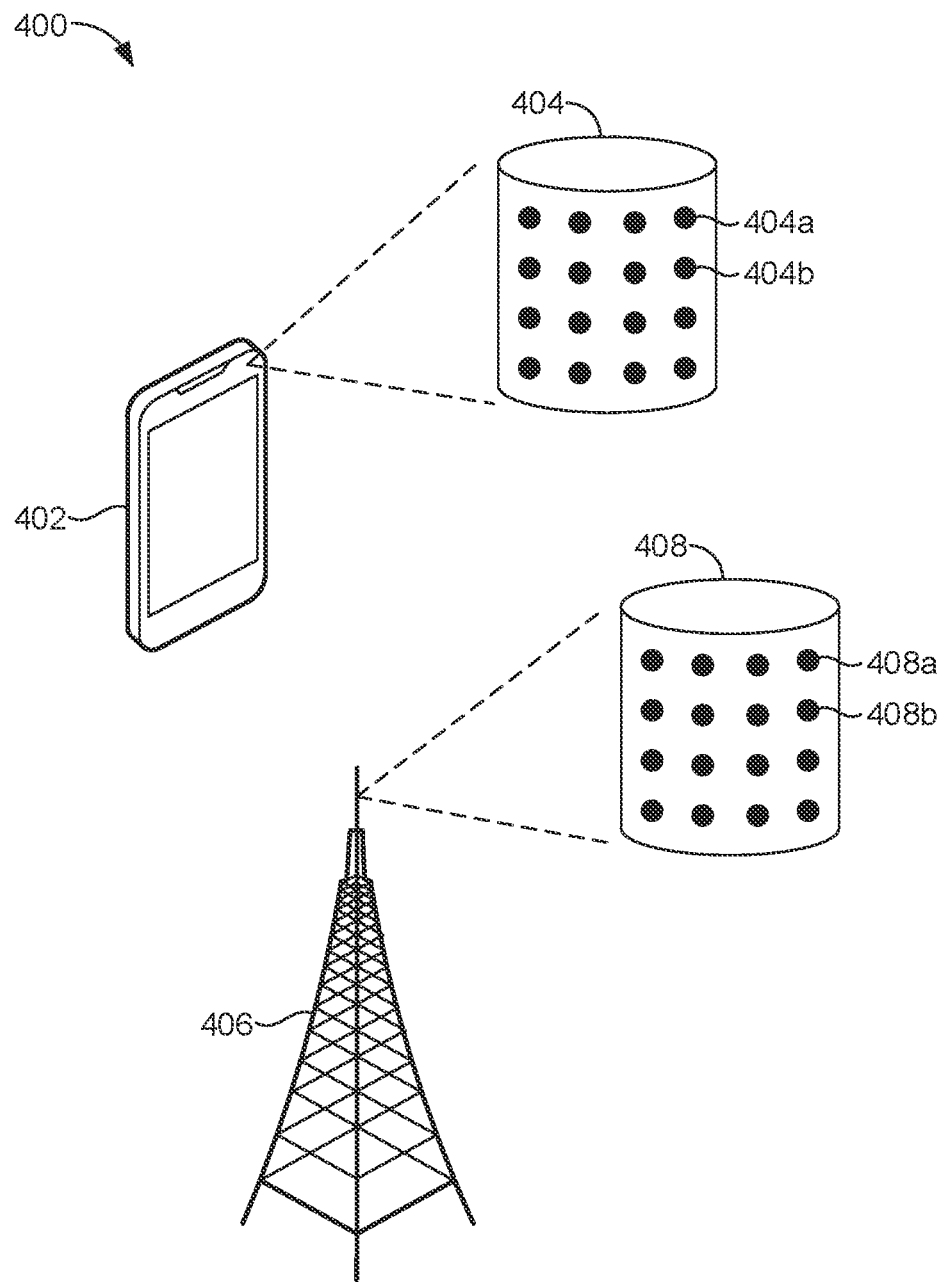
FIG. 4 illustrates a diagram of exemplary physical antenna elements of a base station and a UE, in accordance with aspects herein.

FIG. 4 depicts a diagram 400 of exemplary physical antenna elements of a base station and a UE. As shown, the UE 402 includes a 4×4 antenna array 404, resulting in 16 antenna elements. For example, antenna array 404 includes antenna elements 404a and 404b. Similarly, base station 406 includes a 4×4 antenna array 408, also resulting in 16 antenna elements. As shown, antenna array 408 includes antenna elements 408a and 408b.

As can be appreciated, even a slight physical location difference between 404a and 404b or 408a and 408b can result in a phase shift in the spectrum when UE 402 is communicating with base station 406. Accordingly, UE 402 may have difficulty receiving transmissions from antenna element 408a or 408b based on the port-specific received power level at antenna element 404a or 404b. Similarly, base station 406 may have difficulty receiving transmission from antenna element 404a or 404b based on the port-specific received power level at antenna element 408a or 404b. Accordingly, in aspects, the port-specific transmitted power level at antenna element 404a, 404b, 408a, 408b may be dynamically tuned as described herein.

Figure 5:
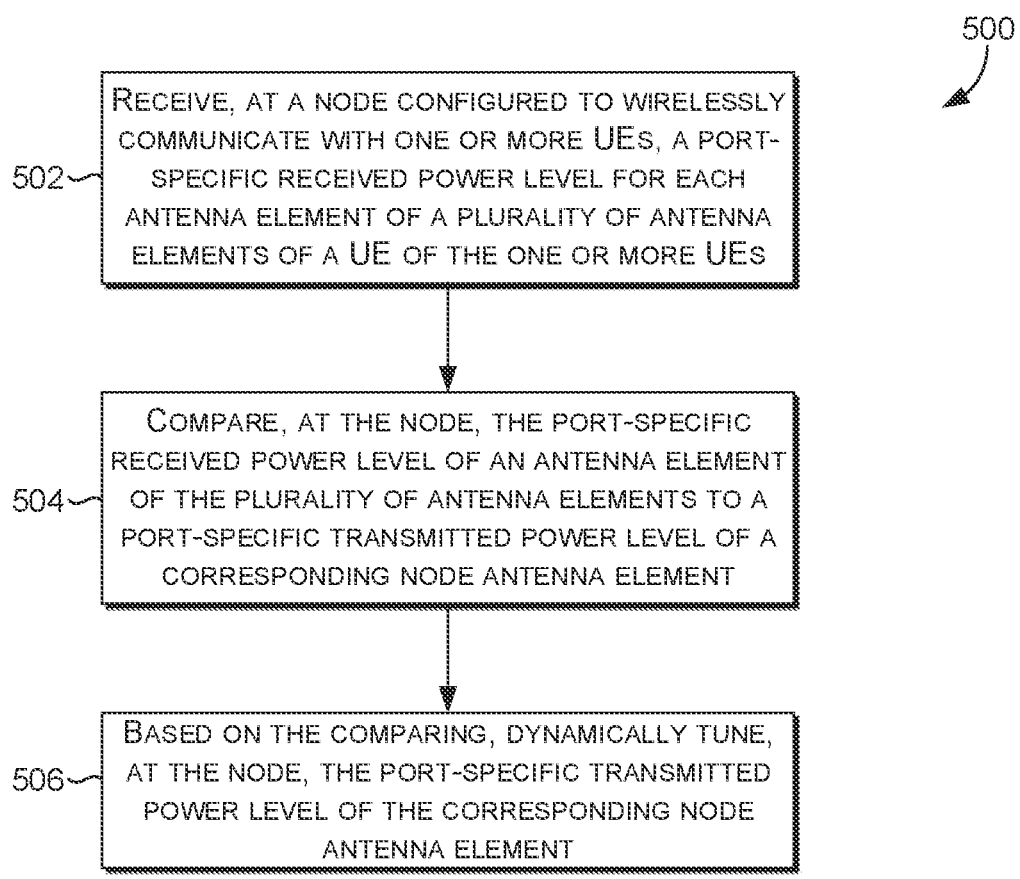
FIG. 5 depicts a flow diagram of a method for providing port-specific power level downlink channel estimation, in accordance with aspects herein.

As shown in FIG. 5 a flow diagram is provided illustrating a method 500 for performing channel estimation in a multiple input multiple output (MIMO) based cellular radio technology, in accordance with various embodiments of the present disclosure. Method 500 may be performed by any computing device (such as computing device described with respect to FIG. 1) with access to a channel estimation system (such as the one described with respect to FIG. 2) or by one or more components of the channel estimation system (such as the channel estimation engine described with respect to FIGS. 2 and 3). Initially, as shown at step 602, a port-specific received power level for each antenna element of a plurality of antenna elements of a UE of one or more UEs is received at a node configured to wirelessly communicate with the one or more UEs. In aspects, the port-specific received power level is received at configurable intervals. In other aspects, the port-specific received power level is received on-demand by the node.

In some aspects, the node communicates, as part of the handshaking process between the node and the UE, the channel to be used by the UE for providing the port-specific received power level. For example, the node may communicate to the UE to use the Physical Uplink Control Channel (PUCCH). In another example, the node may communicate to the UE to use the Physical Uplink Shared Channel (PUSCH).

The port-specific received power level of an antenna element of the plurality of antenna elements is compared at the node, at step 604, to a port-specific transmitted power level of a corresponding node antenna element. The comparing may indicate a ratio of the port-specific received power level of an antenna element of the plurality of antenna elements to the port-specific transmitted power level of a corresponding node antenna element is below a threshold.

Based on the comparing, the port-specific transmitted power level of the corresponding node antenna element is dynamically tuned, at step 606, at the node. For example, the node may dynamically tune the port-specific transmitted power level of the corresponding node antenna element comprises to incrementally increase the port-specific transmitted power level of the corresponding node antenna element. In other words, rather than increasing the port-specific transmitted power level of the corresponding node antenna element to the maximum power level, which may have undesirable effects or consequences, the node increases the power level of the corresponding node antenna element a little bit at a time and may request the port-specific received power level until the comparing indicates the ratio is above the threshold.

In some aspects, the comparing may indicate a ratio of the port-specific received power level of an antenna element of the plurality of antenna elements to the port-specific transmitted power level of the corresponding node antenna element is below a threshold. In this regard, dynamically tuning the port-specific transmitted power level of the corresponding node antenna element may comprise incrementally decreasing the port-specific transmitted power level of the corresponding node antenna element.

Figure 6:
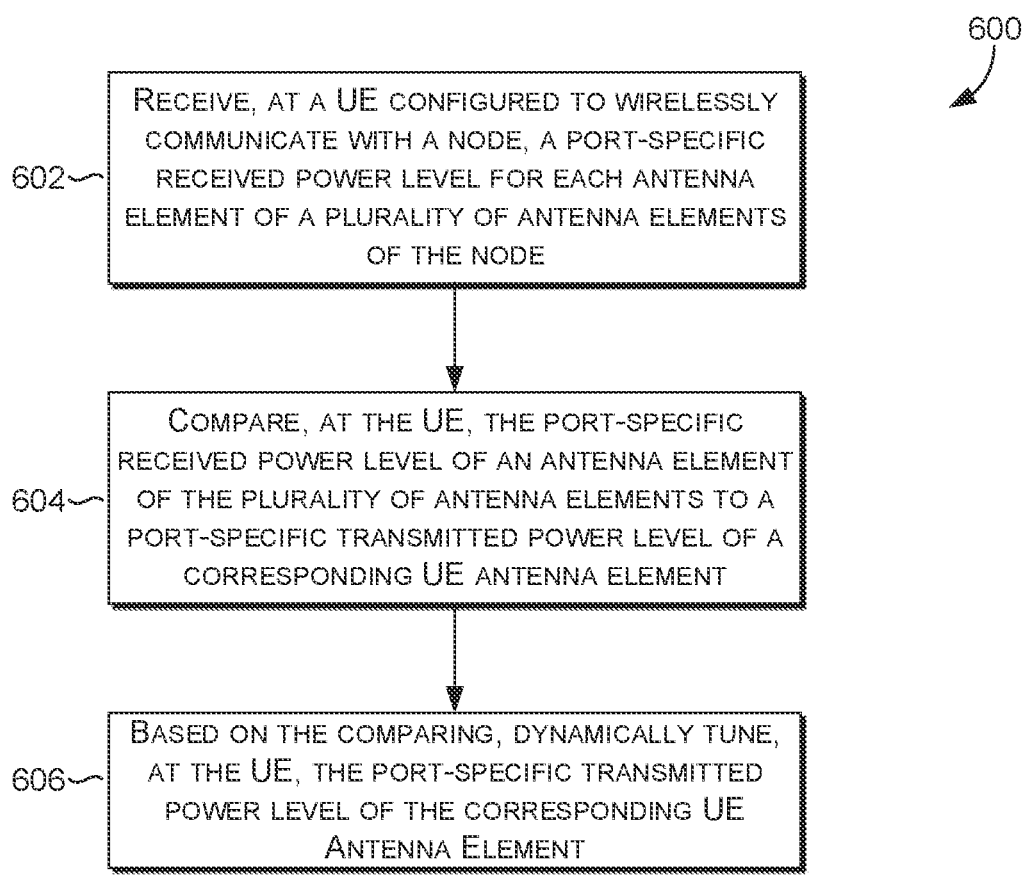
FIG. 6 depicts a flow diagram of a method for providing port-specific power level uplink channel estimation, in accordance with aspects herein.

Turning now to FIG. 6 a flow diagram is provided illustrating a method 600 for performing channel estimation in a multiple input multiple output (MIMO) based cellular radio technology, in accordance with various embodiments of the present disclosure. Method 600 may be performed by any computing device (such as computing device described with respect to FIG. 1) with access to a channel estimation system (such as the one described with respect to FIG. 2) or by one or more components of the channel estimation system (such as the channel estimation engine described with respect to FIGS. 2 and 3). Initially, as shown at step 602, a port-specific received power level is received, at a UE configured to wirelessly communicate with a node, for each antenna element of a plurality of antenna elements of the node. In some aspects, a channel to be used by the UE for receiving the port-specific received power level is received. For example, the node may communicate that the UE should listen for the port-specific received power level from the node on Physical Downlink Control Channel (PDCCH). In another example, the node may communicate that the UE should listen for the port-specific received power level from the node on Physical Downlink Shared Channel (PDSCH)

At step 604, the port-specific received power level of an antenna element of the plurality of antenna elements is compared, at the UE, to a port-specific transmitted power level of a corresponding UE antenna element. The comparing may indicate a ratio of the port-specific received power level of the antenna element of the plurality of antenna elements to the port-specific transmitted power level of the corresponding UE antenna element is below a threshold.

Based on the comparing, at step 606, the port-specific transmitted power level of the corresponding UE antenna element is dynamically tuned, at the UE. In some aspects, dynamically tuning the port-specific transmitted power level of the corresponding UE antenna element comprises incrementally increasing the port-specific transmitted power level of the corresponding UE antenna element.

In some aspects, the comparing may indicate a ratio of the port-specific received power level of an antenna element of the plurality of antenna elements to the port-specific transmitted power level of the corresponding UE antenna element is below a threshold. In this regard, dynamically tuning the port-specific transmitted power level of the corresponding UE antenna element may comprise incrementally decreasing the port-specific transmitted power level of the corresponding UE antenna element.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for performing channel estimation in a multiple input multiple output (MIMO) based cellular radio technology, the method comprising:
  receiving, at a node configured to wirelessly communicate with one or more UEs, a port-specific received power level for each antenna element of a plurality of antenna elements of a UE of the one or more UEs;
  comparing, at the node, the port-specific received power level of an antenna element of the plurality of antenna elements to a port-specific transmitted power level of a corresponding node antenna element, wherein the comparing indicates a ratio of the port-specific received power level of an antenna element of the plurality of antenna elements to the port-specific transmitted power level of a corresponding node antenna element is below a threshold; and
  based on the comparing, dynamically tuning, at the node, the port-specific transmitted power level of the corresponding node antenna element.

2. The method of claim 1, wherein the port-specific received power level is received at configurable intervals.

3. The method of claim 1, wherein the port-specific received power level is received on-demand by the node.

4. The method of claim 1, further comprising communicating, by the node, a channel to be used by the UE for providing the port-specific received power level.

5. The method of claim 4, wherein the channel is Physical Uplink Control Channel (PUCCH).

6. The method of claim 4, wherein the channel is Physical Uplink Shared Channel (PUSCH).

7. The method of claim 1, wherein dynamically tuning the port-specific transmitted power level of the corresponding node antenna element comprises incrementally increasing the port-specific transmitted power level of the corresponding node antenna element.

8. A method for performing channel estimation in a multiple input multiple output (MIMO) based cellular radio technology, the method comprising:
  receiving, at a UE configured to wirelessly communicate with a node, a port-specific received power level for each antenna element of a plurality of antenna elements of the node;
  comparing, at the UE, the port-specific received power level of an antenna element of the plurality of antenna elements to a port-specific transmitted power level of a corresponding UE antenna element, wherein the comparing indicates a ratio of the port-specific received power level of the antenna element of the plurality of antenna elements to the port-specific transmitted power level of the corresponding UE antenna element is above a threshold; and
  based on the comparing, dynamically tuning, at the UE, the port-specific transmitted power level of the corresponding UE antenna element.

9. The method of claim 8, further comprising receiving, at the UE, a channel to be used by the UE for receiving the port-specific received power level.

10. The method of claim 8, wherein dynamically tuning the port-specific transmitted power level of the corresponding UE antenna element comprises incrementally decreasing the port-specific transmitted power level of the corresponding UE antenna element.

11. A system for performing channel estimation in a multiple input multiple output (MIMO) based cellular radio technology, the system comprising:
one or more UEs; and
a node configured to wirelessly communicate with the one or more UEs, wherein each of the one or more UEs and/or the node are configured to:
(1) receive a port-specific received power level for each antenna element of a plurality of antenna elements;
(2) compare the port-specific received power level of an antenna element of the plurality of antenna elements to a port-specific transmitted power level of a corresponding transmitting antenna element; and
(3) based on the comparing, dynamically tuning the port-specific transmitted power level of the corresponding transmitting antenna element, wherein dynamically tuning the port-specific transmitted power level of the corresponding transmitting antenna element comprises: incrementally increasing the port-specific transmitted power level of the corresponding transmitting antenna element if the comparing indicates a ratio of the port-specific received power level of the antenna element of the plurality of antenna elements is above a threshold; or incrementally decreasing the port-specific transmitted power level of the corresponding transmitting antenna element if the comparing indicates a ratio of the port-specific received power level of the antenna element of the plurality of antenna elements is below a threshold.

12. The system of claim 11, wherein the antenna element of the plurality of antenna elements corresponds to the node and the corresponding transmitting antenna element corresponds to a UE of the one or more UEs.

13. The system of claim 11, wherein the antenna element of the plurality of antenna elements corresponds to a UE of the one or more UEs and the corresponding transmitting antenna element corresponds to the node.

* * * * *